United States Patent
Gaunt

(10) Patent No.: US 7,048,453 B1
(45) Date of Patent: May 23, 2006

(54) CAMERA ACTUATOR

(75) Inventor: John W. Gaunt, Greenwood, DE (US)

(73) Assignee: Wintron Technologies, Howard, PA (US)

( * ) Notice: Subject to any disclaimer, the term of this patent is extended or adjusted under 35 U.S.C. 154(b) by 114 days.

(21) Appl. No.: 10/710,390

(22) Filed: Jul. 7, 2004

Related U.S. Application Data

(60) Provisional application No. 60/481,943, filed on Jan. 23, 2004.

(51) Int. Cl.
G03B 17/00 (2006.01)
H04N 5/225 (2006.01)
F16M 11/00 (2006.01)
H04N 7/18 (2006.01)
H04N 9/47 (2006.01)

(52) U.S. Cl. .......... 396/420; 396/428; 348/82; 348/148; 348/376; 248/176.1

(58) Field of Classification Search ........ 396/420, 396/424, 425, 427, 428; 248/187.1, 176.1; 352/243; 348/219.1, 373, 375, 376, 82, 148
See application file for complete search history.

(56) References Cited

U.S. PATENT DOCUMENTS

| | | | |
|---|---|---|---|
| 6,056,450 A * | 5/2000 | Walling | 396/428 |
| 6,530,702 B1 * | 3/2003 | Harris | 396/420 |
| 6,932,305 B1 * | 8/2005 | Morales et al. | 248/187.1 |
| 6,962,313 B1 * | 11/2005 | Marks, Jr. | 248/200 |
| 2002/0097321 A1 * | 7/2002 | McBride | 348/148 |

* cited by examiner

*Primary Examiner*—Michael Tokar
*Assistant Examiner*—Rishi Suthar
(74) *Attorney, Agent, or Firm*—John J. Elnitski, Jr.

(57) ABSTRACT

A camera actuator having a main body, camera support, camera link, push arm and actuator cable. The main body rotatably mounts to a pole. The camera support extends from the front of the main body. The camera support is adapted to rotatably receive a camera. The camera link connects to the camera, where movement of the camera link moves the camera about the camera support. The push arm extends from the front of the main body and is connected to the camera link. The push arm mounts in the main body such that the push arm slides in and out of the front of the main body to rotate the camera. The push arm mounts in the main body such that rotation of the push arm rotates the main body. The actuator cable extends into the rear of the main body from the pole and connects to the push arm.

20 Claims, 5 Drawing Sheets

CAMERA ACTUATOR

CROSS REFERENCE TO RELATED APPLICATIONS

This application claims the benefit of and incorporates by reference U.S. Provisional Application No. 60/481,943 filed Jan. 23, 2004.

BACKGROUND OF INVENTION

The present invention generally relates to camera actuators used for controlling movement of a camera. More specifically, the present invention relates to a camera actuator used to control a camera about two axes on a pole configuration.

There are many different types of camera devices which are available to look under objects such as automobiles for security and around objects at a disaster scene. Most of these devices lack ease of use when trying to move the camera to obtain a accurate view of the area in question, while at the same time allowing the user to observe what the camera is projecting on a display.

It is an object of the present invention to provide a camera actuator that allows the user to easily rotate a camera while moving the camera under or about objects.

SUMMARY OF INVENTION

A camera actuator having a main body, camera support, camera link, push arm and actuator cable. The main body rotatably mounts to a pole. The camera support extends from the front of the main body. The camera support is adapted to rotatably receive a camera. The camera link connects to the camera, where movement of the camera link moves the camera about the camera support. The push arm extends from the front of the main body and is connected to the camera link. The push arm mounts in the main body such that the push arm slides in and out of the front of the main body to rotate the camera. The push arm mounts in the main body such that rotation of the push arm rotates the main body. The actuator cable extends into the rear of the main body from the pole and connects to the push arm.

DETAILED DESCRIPTION

Figure 1:
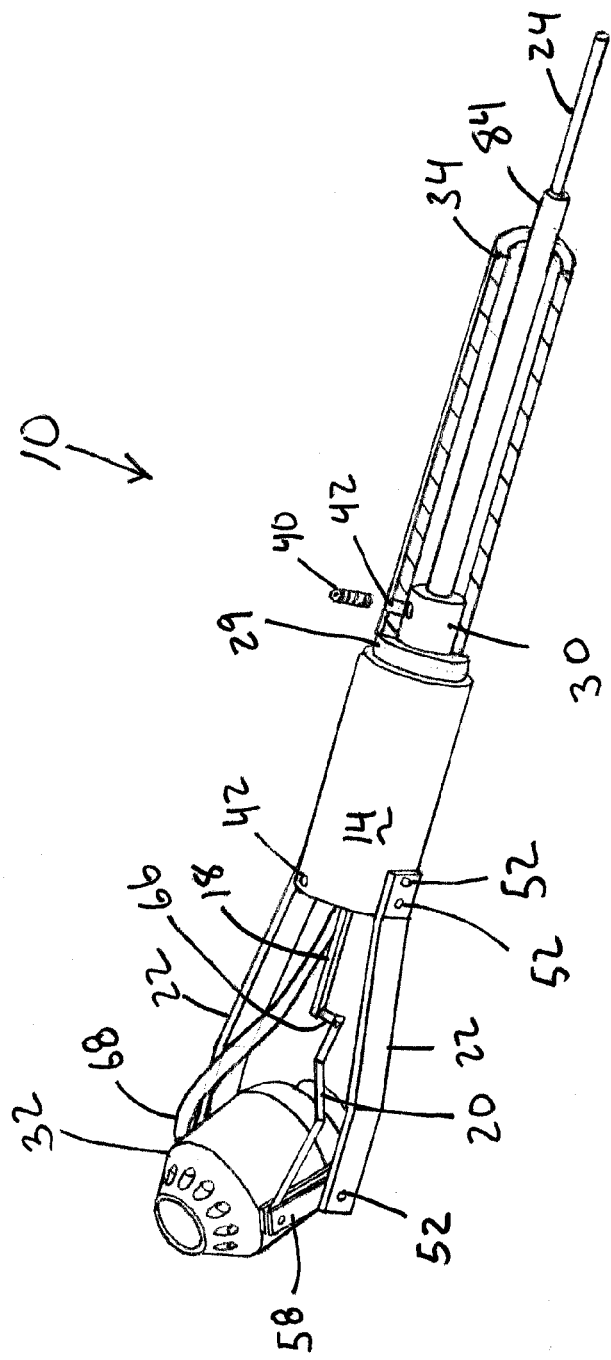
FIG. 1 is a perspective view of a camera actuator according to the present invention.

The present invention is a camera actuator 10, as shown in FIGS. 1–5. The camera actuator 10 is shown for mounting on a pole, but could be used in other applications. The camera actuator 10 is made up of several components, which include a main body 14, front cap 16, push arm 18, camera link 20, camera supports 22, actuator cable 24, coupler 26, rear bearing 28, felt ring 29 and rotation head 30. A camera 32 and pole 34 are also shown in FIG. 1.

Figure 2:
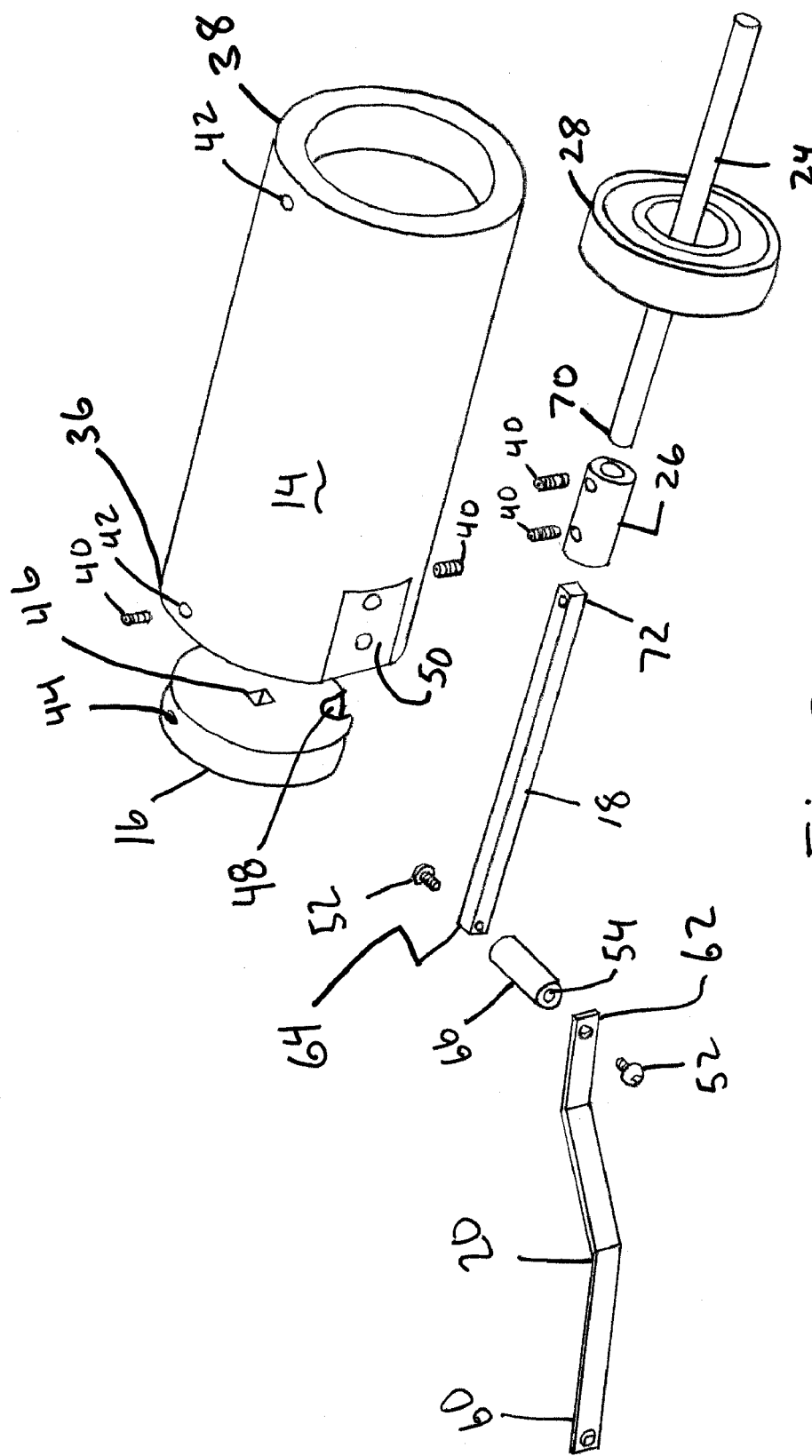
FIG. 2 is a perspective exploded view of the camera support actuator according to the present invention.

The main body 14 is shown as a hollow open ended cylinder with a front end 36 and a rear end 38. The front cap 16 fits into the open end of the front end 36 of the main body 14. The front cap 16 is secured in the main body 14 using two set screws 40 which screw into set screw holes 42 and against the side 44 of the front cap 16. The front cap 16 includes a push arm hole 46 and a wire groove 48, as shown in FIG. 2. The push arm hole 46 is in the middle of the front cap 16. The main body 14 includes two mounting areas 50 milled into the main body 14 to allow mounting of the camera supports 22. Two screws 52 are shown screwed into screw holes 54 to fasten a rear end 56 of each of the camera supports 22 to the main body 14. Rotatably mounted between the camera supports 22 is the camera 32. The camera 32 includes a link mounting point 58 to rotatably attach a front end 60 of the camera link 20 to the camera 32. A rear end 62 of the camera link 20 is rotatably attached to a front end 64 of the push arm 18. A spacer 66 is used between the front end 64 of the push arm 18 and the rear end 62 of the camera link 20. A screw 52 is used to attach the front end 60 of the camera link 20 to the link mounting point 58 of the camera 32. A screw 52 is used on each end of the spacer 66 to attach the rear end 62 of the camera link 20 to the spacer 66 and attach the front end 60 of the push arm 18 to the spacer 66. The camera link 20 is shown in an angled configuration to allow an aligned attachment between the push arm 18 and the camera 32. A camera wire 68 is shown which runs from the camera 32 into the main body 14 using the wire groove 48. Movement of the push arm 18 forward and rearward in the main body 14 transfers into a rotational movement of the camera 32 about the camera supports 22 due movement of the camera link 20. This rotational movement of the camera 32 about the camera supports 22 is the first axis of movement control of the camera 32.

Figure 3:
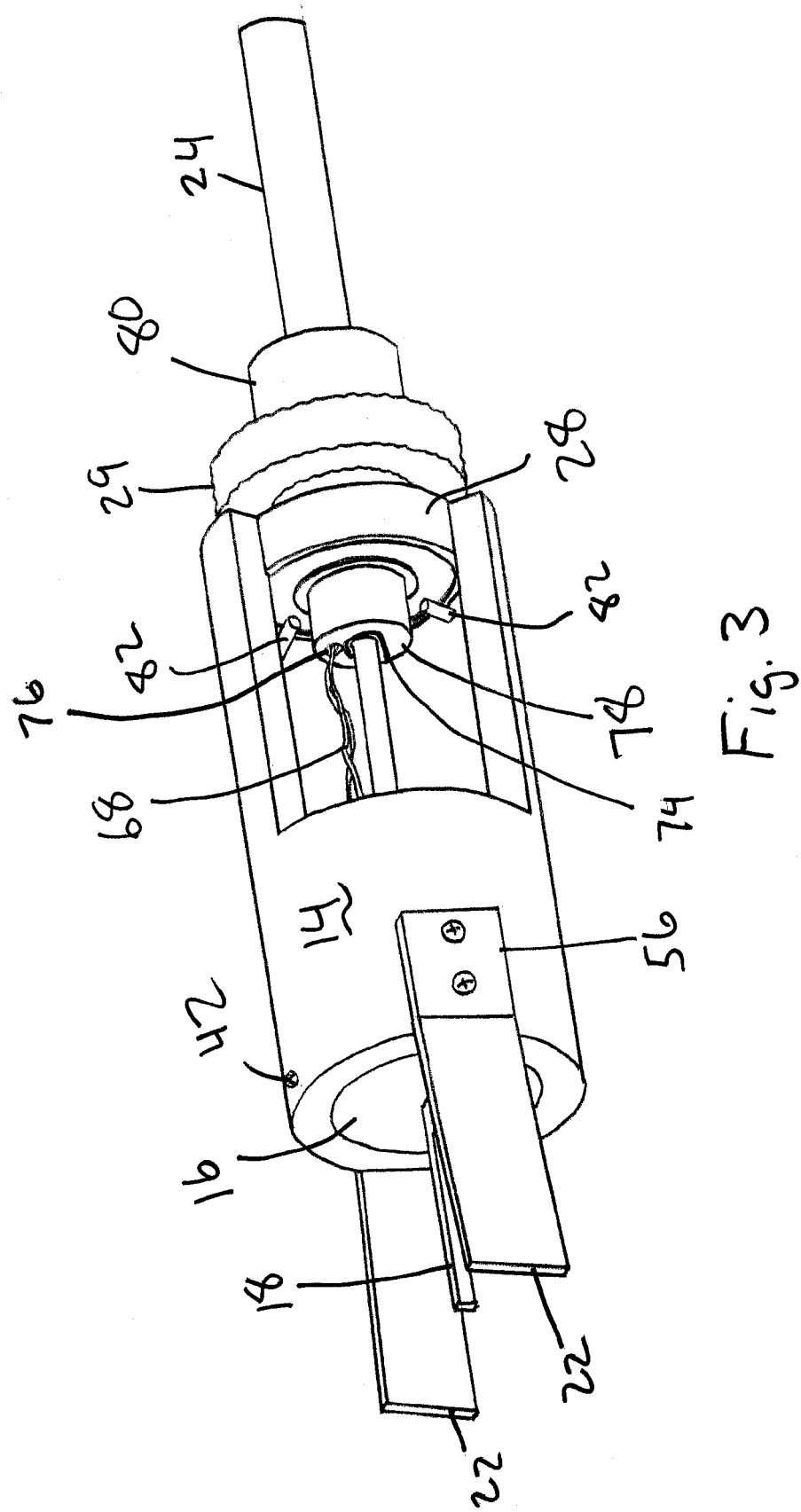
FIG. 3 is a perspective cut-a-away view of a main body of the camera actuator according to the present invention.
Figure 4:
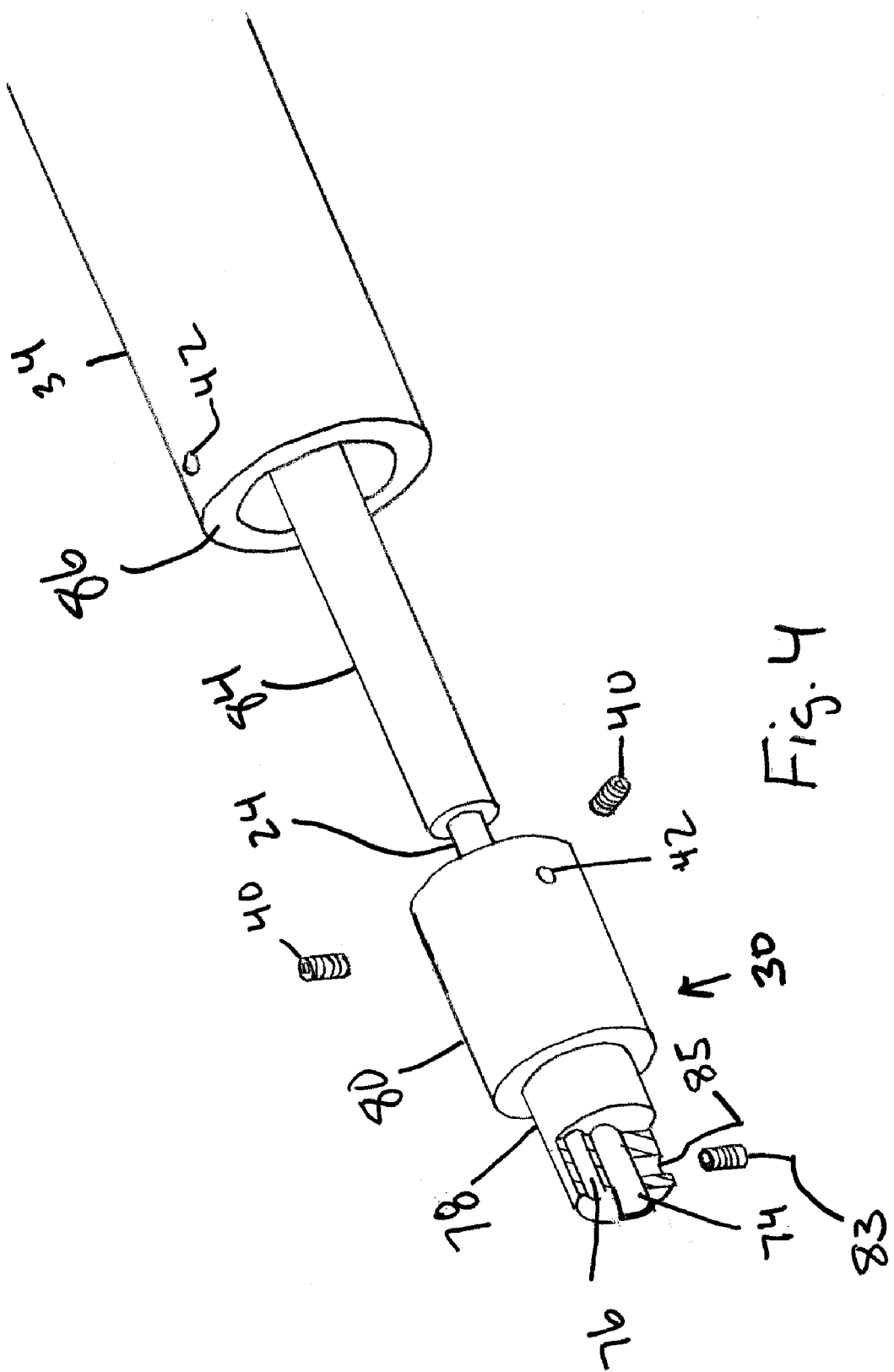
FIG. 4 is a perspective view of some of the components of the camera actuator according to the present invention.
Figure 5:
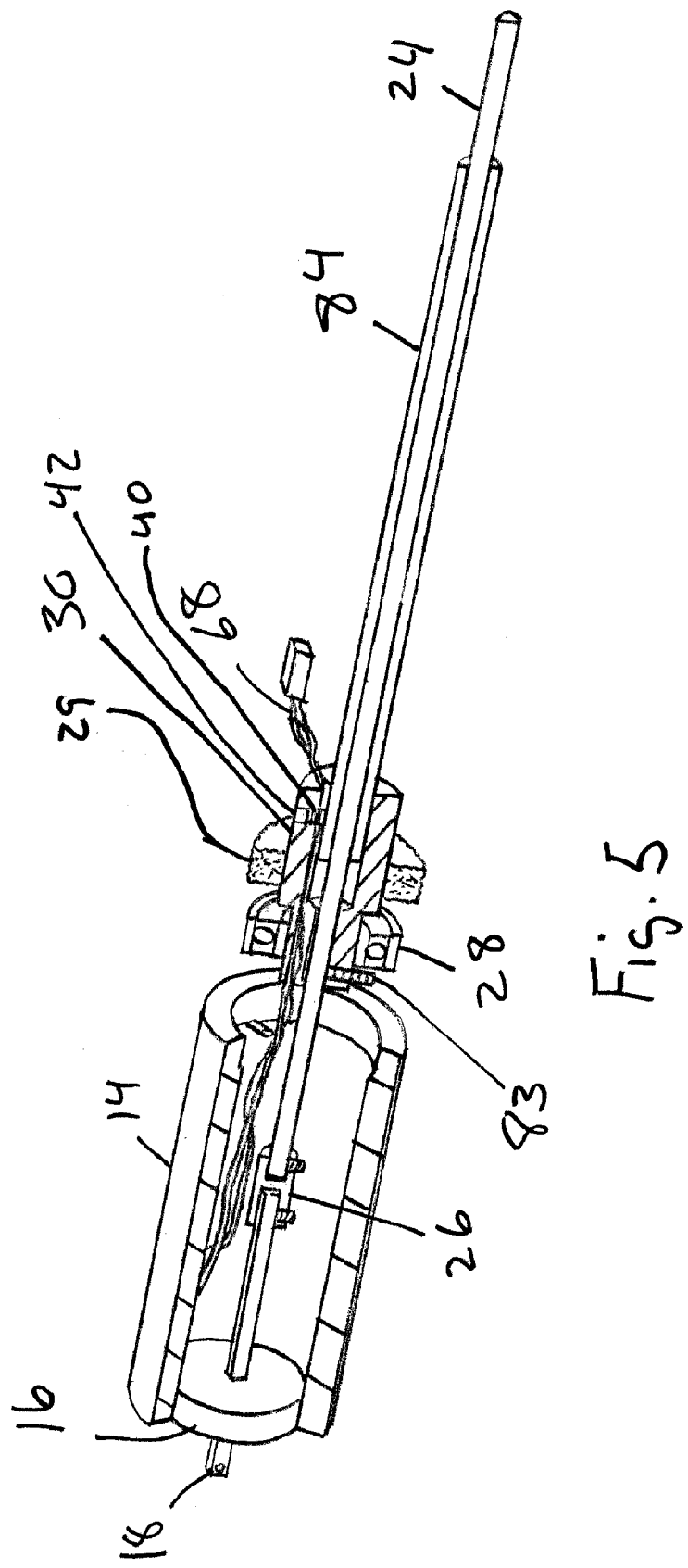
FIG. 5 is a side cross-sectional view of the camera actuator according to the present invention.

FIGS. 2 and 4 shows a front end 70 of the actuator cable 24 and a rear end 72 of the push arm 18 connected to the coupler 26 to inter-connect the push arm 18 to the actuator cable 24. Set screws 40 are used to retain the front end 70 of the actuator cable 24 and the rear end 72 of the push arm 18 in the coupler 26. The rotation head 30 is a cylinder shape and includes an actuator cable hole 74 and a wire hole 76. The rotation head 30 includes a front section 78 and a rear section 80. The front section 78 has a smaller diameter outside than the rear section 80. The rear bearing 28 is pressed onto the front section 78 of the rotation head 30, so that the rear bearing 28 and the rotation head 30 act as one together. The actuator cable 24 passes through the actuator cable hole 74 of the rotation head 30. The camera wire 68 passes through the wire hole 76 of the rotation head 30. FIG. 3 shows the rear bearing 28 mounted in the rear end 38 of the main body 14. As shown in FIG. 3, the main body 14 includes long screws 82 extending into the main body 14. FIGS. 4 and 5 show a long set screw 83 which partially screws into set screw hole 85. Long set screw 83 is aligned to contact either of the long screws 82. Set screws 40 screw into the set screw holes 42 and against the outside surface of the rear bearing 28 in the rear end 38 of the main body 14 to secure the rear bearing 28 in place. This in turn secures the rotation head 30 in place, since the rotation head 30 and the rear bearing 28 are attached to each other due to pressing of the rear bearing 28 onto the rotation head 30. The diameter of the actuator cable hole 74 is larger on the rear section 80 of the rotation head 30. This to receive a protective cable cover 84 which runs the length of the actuator cable 24 from the rotation head 30 to a rear end of the pole 34. The protective cable cover 84 is secured in the rotation head 30 using a set screw 40 which screws into a set screw hole 42 and against an outside surface of the protective cable cover 84. The pole 34 includes a front end 86 which slides over the protective cable 84 and over the rear section 80 of the rotation head 30. The front end 86 of the pole 34 is secured to the rear section 80 of the rotation head 30 using a set screw 40 which screws into a set screw hole 42 and against an outside surface of the rear section 80 of the rotation head 30.

The camera actuator 10 functions as follows. A handle (not shown) is attached to the actuator cable 24 at the rear of the pole 34. The handle is configured to allow pulling and pushing of the actuator cable 24 inside the pole 34. The handle is also configured to allow rotation of the actuator cable 24 in the pole 34. A typical cable type used for the actuator cable 24 is a speedometer cable commonly used in automobiles. The speedometer cable allows for easy rotation of the actuator cable 24. The user pushes and pulls the actuator cable 24 inside the pole 34, which in turn pushes and pulls on the push arm 18 via the coupler 26. Pushing and pulling of the push arm 18 causes the camera 32 to rotate about the support arms 22, due to the camera link 20 and its rotation points at the spacer 66 and link mounting point 58. Rotation of the actuator cable 24 rotates the push arm 18, which in turn rotates the front cap 16. The push arm hole 46 is shown as a square and the push arm 18 is shown as a square. Having a push arm hole 46 and push arm 18 similarly shaped with some sort of edge, allows for sliding of the push arm 18 in and out of the push arm hole 46, while causing rotation of the front cap 16 when the push arm 18 is rotated. Rotation of the front cap 16 causes rotation of the main body 14. The rotating main body 14 rotates about the pole 34 and the rotation head 30 due to the rear bearing 28, thereby allowing the pole 34 to remain stationary. Rotation of the main body 14 causes rotation of the camera supports 22 and the camera 32 about the axis of the pole 34, which is movement control of the camera 32 about a second axis. Therefore, movement of the actuator cable 24 along the pole 34 and rotation of the actuator cable 24 cause movement of the camera 32 about two axes. Screws 82 and 83 are optional and are used to limit rotation of the actuator cable 24, so that the wire 68 does not get twisted. When screw 83 contacts one of the two screws 82, rotation is stopped in that direction. The felt ring 29 is mounted to the rear section 80 of the rotation head 30 and serves as a protective spacer between the rear bearing 28 and the pole 34. The felt ring 29 also acts as a friction ring, whereby the amount of friction depends on how tight the pole 34 is mounted against the felt ring 29.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

The invention claimed is:

1. A camera actuator, adapted for mounting on a pole and adapted to receive a camera, comprising:
    a main body having a front and a rear, said rear of said main body adapted to rotatably mount to the pole;
    at least one camera support extending from said front of said main body, said at least one camera support adapted to receive the camera such that the camera can rotate about said at least one camera support;
    a camera link adapted to be connected to the camera wherein movement of said camera link moves the camera to rotate about said at least one camera support;
    a push arm extending from said front of said main body connected to said camera link, said push arm mounted in said main body such that said push arm slides in and out of said front of said main body to rotate the camera, said push arm mounted in said main body such that rotation of said push arm rotates said main body;
    an actuator cable extending into said rear of said main body from the pole, said actuator cable connected to said push arm such that pushing and pulling of said actuator cable pushes and pulls said push arm and rotation of said actuator cable rotates said push arm.

2. The camera actuator of claim 1, wherein there are two camera supports extending from said front of said main body which are adapted so that the camera can be mounted to rotate between said two camera supports.

3. The camera actuator of claim 1, wherein said actuator cable is a speedometer cable.

4. The camera actuator of claim 1, wherein said push arm includes at least one edge; wherein said front of said main body is solid with a push arm hole which allows passage of said push arm; and wherein said push arm hole includes at least one edge to interact with said at least one edge of said push arm to cause rotation of said main body due to rotation of said push arm.

5. The camera actuator of claim 4, wherein said push arm hole is square.

6. The camera actuator of claim 1, wherein said camera link is rotatably attached to the camera and rotatably attached to said push arm to effect rotation of the camera due to movement of said push arm in and out of said main body.

7. The camera actuator of claim 1, further including a rear bearing mounted in said rear of said main body; and
    further including a rotation head, said rotation head including a front section and a rear section, said rotation head including an actuator cable hole to allow said actuator cable to freely pass through said rotation head, said front section connected to said rear bearing so that said rear bearing and said rotation head act as one together, said rear section adapted for connection to the pole such that rotation of said actuator cable rotates said push arm which rotates said main body, whereby said main body rotates about the pole due to said rear bearing and interconnection of said rotation head with said rear bearing and the pole.

8. The camera actuator of claim 6, wherein said main body and said rotation head include passages for a camera wire to run from the camera to the pole.

9. The camera actuator of claim 1, wherein said push arm includes at least one edge; wherein said front of said main body is solid with a push arm hole which allows passage of said push arm; wherein said push arm hole includes at least one edge to interact with said at least one edge of said push arm to cause rotation of said main body due to rotation of said push arm; further including a rear bearing mounted in said rear of said main body;
    and further including a rotation head, said rotation head including a front section and a rear section, said rotation head including and an actuator cable hole to allow said actuator cable to freely pass through said rotation head, said front section connected to said rear bearing so that said rear bearing and said rotation head act as one together, said rear section adapted for connection to the pole such that rotation of said actuator cable rotates said push arm which rotates said main body, whereby said main body rotates about the pole due to said rear bearing and interconnection of said rotation head with said rear bearing and the pole.

10. The camera actuator of claim 9, wherein there are two camera supports extending from said front of said main body which are adapted so that the camera can be mounted to rotate between said two camera supports.

11. The camera actuator of claim 9, wherein said actuator cable is a speedometer cable.

12. The camera actuator of claim 9, wherein said camera link is rotatably attached to the camera and rotatably attached to said push arm to effect rotation of the camera due to movement of said push arm in and out of said main body.

13. The camera actuator of claim 7, wherein there are two camera supports extending from said front of said main body which are adapted so that the camera can be mounted to rotate between said two camera supports.

14. The camera actuator of claim 7, wherein said actuator cable is a speedometer cable.

15. The camera actuator of claim 7, wherein said camera link is rotatably attached to the camera and rotatably attached to said push arm to effect rotation of the camera due to movement of said push arm in and out of said main body.

16. A camera actuator kit for addition to a pole, said camera actuator kit adapted for mounting on a pole and adapted to receive a camera, comprising:
  a main body having a front and a rear, said rear of said main body adapted to rotatably mount to the pole;
  at least one camera support extending from said front of said main body, said at least one camera support adapted to receive the camera such that the camera can rotate about said at least one camera support;
  a camera link adapted to be connected to the camera wherein movement of said camera link moves the camera to rotate about said at least one camera support;
  a push arm extending from said front of said main body connected to said camera link, said push arm mounted in said main body such that said push arm slides in and out of said front of said main body to rotate the camera, said push arm mounted in said main body such that rotation of said push arm rotates said main body;
  an actuator cable extending into said rear of said main body from the pole, said actuator cable connected to said push arm such that pushing and pulling of said actuator cable pushes and pulls said push arm and rotation of said actuator cable rotates said push arm.

17. The camera actuator of claim 16, wherein there are two camera supports extending from said front of said main body which are adapted so that the camera can be mounted to rotate between said two camera supports.

18. The camera actuator of claim 16, wherein said push arm includes at least one edge; wherein said front of said main body is solid with a push arm hole which allows passage of said push arm; and wherein said push arm hole includes at least one edge to interact with said at least one edge of said push arm to cause rotation of said main body due to rotation of said push arm.

19. The camera actuator of claim 16, wherein said camera link is rotatably attached to the camera and rotatably attached to said push arm to effect rotation of the camera due to movement of said push arm in and out of said main body.

20. The camera actuator of claim 16, further including a rear bearing mounted in said rear of said main body; and
  further including a rotation head, said rotation head including a front section and a rear section, said rotation head including and an actuator cable hole to allow said actuator cable to freely pass through said rotation head, said front section connected to said rear bearing so that said rear bearing and said rotation head act as one together, said rear section adapted for connection to the pole such that rotation of said actuator cable rotates said push arm which rotates said main body, whereby said main body rotates about the pole due to said rear bearing and interconnection of said rotation head with said rear bearing and the pole.

* * * * *